United States Patent
Boaz

(10) Patent No.: US 6,826,929 B2
(45) Date of Patent: Dec. 7, 2004

(54) METHOD FOR SIMULTANEOUSLY HEATING AND COOLING GLASS TO PRODUCE TEMPERED GLASS

(76) Inventor: Premakaran T. Boaz, 16842 Yorkshire, Livonia, MI (US) 48154

(*) Notice: Subject to any disclaimer, the term of this patent is extended or adjusted under 35 U.S.C. 154(b) by 42 days.

(21) Appl. No.: 10/247,386

(22) Filed: Sep. 19, 2002

(65) Prior Publication Data

US 2003/0233846 A1 Dec. 25, 2003

Related U.S. Application Data

(60) Provisional application No. 60/323,223, filed on Sep. 19, 2001.

(51) Int. Cl.[7] .......................................... C03B 27/044
(52) U.S. Cl. .............................. 65/114; 65/117; 65/118; 65/273; 65/274
(58) Field of Search ............................ 65/95, 114, 117, 65/118, 348, 349, 269, 273, 274

(56) References Cited

U.S. PATENT DOCUMENTS

| | | | |
|---|---|---|---|
| 4,900,894 A | * | 2/1990 | Tanaka et al. ......... 219/121.59 |
| 5,782,947 A | | 7/1998 | Boaz |
| 5,827,345 A | | 10/1998 | Boaz et al. |
| 6,000,244 A | | 12/1999 | Boaz |
| 6,408,649 B1 | * | 6/2002 | Sklyarevich et al. ........... 65/102 |
| 2002/0162610 A1 | * | 11/2002 | Shrout et al. ................ 148/525 |

* cited by examiner

Primary Examiner—Steven P. Griffin
Assistant Examiner—Carlos Lopez
(74) Attorney, Agent, or Firm—Bliss McGlynn, P.C.

(57) ABSTRACT

A system and method for heating, forming, and tempering a glass sheet includes pre-heating the glass sheet to at least a first predetermined temperature. The system and method includes also applying radio-frequency energy to the glass sheet to heat it to at least a second predetermined temperature and cooling at least one outer surface of the glass sheet to at least a third predetermined temperature to temper the glass sheet.

12 Claims, 4 Drawing Sheets

METHOD FOR SIMULTANEOUSLY HEATING AND COOLING GLASS TO PRODUCE TEMPERED GLASS

CROSS-REFERENCE TO RELATED APPLICATION(S)

The present application claims benefit of U.S. Provisional Patent Application No. 60/323,223 filed Sep. 19, 2001 and entitled "System for Simultaneously Heating and Cooling Glass to Produce Tempered Glass."

BACKGROUND OF THE INVENTION

1. Field of the Invention

The present invention relates generally to tempered glass and, more particularly, to a system and method for simultaneously heating and cooling glass to produce tempered glass.

2. Description of the Related Art

Tempered or heat-treated glass is generally defined as glass (e.g., annealed or ordinary) that has been pre-stressed by being heated to a temperature substantially at or above the glass's softening point and being forced to suddenly and rapidly quench under carefully controlled conditions. The tempering process produces tempered glass having highly desirable conditions of induced stress that result in additional strength, resistance to thermal stress, and impact resistance as compared to annealed or ordinary glass.

The basic principle employed in the tempering process is to create an initial condition of glass-surface and edge compression. This condition is achieved by first heating the glass and then quenching the surfaces of the glass rapidly. Such heating and quenching leaves the center thickness of the glass hot relative to the surfaces of the glass. As the center thickness cools, the surfaces are forced into compression. Wind pressure, missile impact, thermal stresses, or other applied loads must first overcome this compression before there is any possibility of fracture of the glass.

With respect to the heating step, it is known to use a hearth or lehr to heat glass sheets that are to be tempered. Generally speaking, a lehr is a furnace and may be of a continuous roller-type, fixtured roller-type, or gas-type. For example, a gas-type lehr has a plurality of blocks disposed beneath a plurality of radiant heaters. Typically, a glass sheet is placed inside the lehr where the glass sheet is heated by conventional radiation, convection, and conduction heat. The glass sheet is moved along the blocks at a predetermined rate, which depends upon the thermal conductivity of the glass sheet, to reach a temperature in the glass sheet's forming range. When such a temperature is reached (e.g., approximately 1200° F.), the glass sheet is formed to a predetermined shape of the blocks.

Once formed, the glass sheet is rapidly air-quenched, typically by application of an air stream to the glass sheet. The air stream can consist of arrays of fixed, reciprocating, or rotating nozzles. It is important to extract heat uniformly from both surfaces of the glass sheet (uneven heat extraction may produce bow or warp) and to sustain the quench long enough to prevent reheating of the glass surfaces from the still-hot center of the glass sheet. A quenched condition becomes stable when the glass sheet is reduced to a temperature of approximately 400° F. to 600° F.

Although the above-described lehr works well, it suffers from the disadvantage that the lehr must be long enough in length to allow the glass sheet to be heated at the predetermined rate. This length requires a large quantity of floor space, energy consumption, and cost.

A recent approach to overcoming this disadvantage is to employ microwave energy [at frequencies in the range of 2 gigahertz (GHz) to 40 GHz] to rapidly and efficiently heat a glass sheet that has been pre-heated to a temperature substantially at or above its softening temperature by conventional means. This approach is more fully described in U.S. Pat. Nos. 5,782,947 and 5,827,345 to Boaz, the disclosures of which are hereby incorporated by reference.

U.S. Pat. No. 5,782,947 to Boaz discloses a method for heating a glass sheet including the steps of heating the glass sheet to a first predetermined temperature and applying microwave energy to the glass sheet to heat it to at least a second predetermined temperature to allow the glass sheet to be formed. One advantage of the method described in U.S. Pat. No. 5,782,947 to Boaz is that the length of the lehr is reduced, which results in less floor space and increased throughput (speed and yield) of the glass sheet that is formed.

U.S. Pat. No. 5,827,345 to Boaz discloses a method for heating, forming, and tempering a glass sheet including the steps of heating the glass sheet to at least a first predetermined temperature, applying microwave energy to the glass sheet to heat it to at least a second predetermined temperature, forming the glass sheet to a predetermined configuration, and cooling at least one outer surface of the glass sheet to at least a third predetermined temperature to temper the glass sheet. One advantage of the method described in U.S. Pat. No. 5,827,345 to Boaz is that a relatively thin glass sheet (e.g., less than 0.125 inch in thickness) can be tempered. More specifically, while the center of the glass sheet is being heated by the microwave energy, the outer surfaces of the glass sheet are being cooled, thus creating a desired temperature differential or gradient between the center and the outer surfaces of the glass sheet.

Although the methods described in U.S. Pat. Nos. 5,782,947 and 5,827,345 to Boaz represent significant advances in glass-tempering technology, these methods suffer from the disadvantage that the disclosed microwave-energy levels (i.e., having a frequency range of 2 GH to 40 GH) are relatively expensive to generate and maintain over an extended production period. Additionally, the use of such high frequency microwave energy levels presents operational problems in a conventional production facility setting. Therefore, there is a need in the art for a system and method for rapidly, efficiently, and inexpensively heating glass during the heating portion of the tempering process while maintaining a desired temperature differential or gradient between the center of the glass sheet and the outer surfaces of the glass sheet to facilitate the production of tempered glass, especially relatively thin tempered glass.

SUMMARY OF THE INVENTION

Accordingly, the present invention is a system and method for heating, forming, and tempering a glass sheet that includes pre-heating the glass sheet to at least a first predetermined temperature. The system and method also includes applying radio-frequency energy to the glass sheet to heat the glass sheet to at least a second predetermined temperature and cooling at least one outer surface of the glass sheet to at least a third predetermined temperature to temper the glass sheet.

One advantage of the present invention is that a system and method for simultaneously heating and cooling glass to produce tempered glass is provided. Another advantage of the present invention is that the system and method are particularly useful for producing relatively thin tempered glass. Yet another advantage of the present invention is that the system and method uses radio-frequency energy to rapidly, efficiently, and inexpensively heat glass that has been pre-heated to a temperature substantially at or above its softening temperature by conventional means. Simultaneously, the heated glass is cooled to maintain a desired temperature differential or gradient between the center of the glass and the outer surfaces of the glass, with the center having a higher temperature than that of the outer surfaces. The treated glass is then quenched to produce tempered glass. Still another advantage of the present invention is that the system and method may be used to temper normal thickness glass, e.g. 0.1875 inches, by using less compress air for the quenching of the heated glass.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
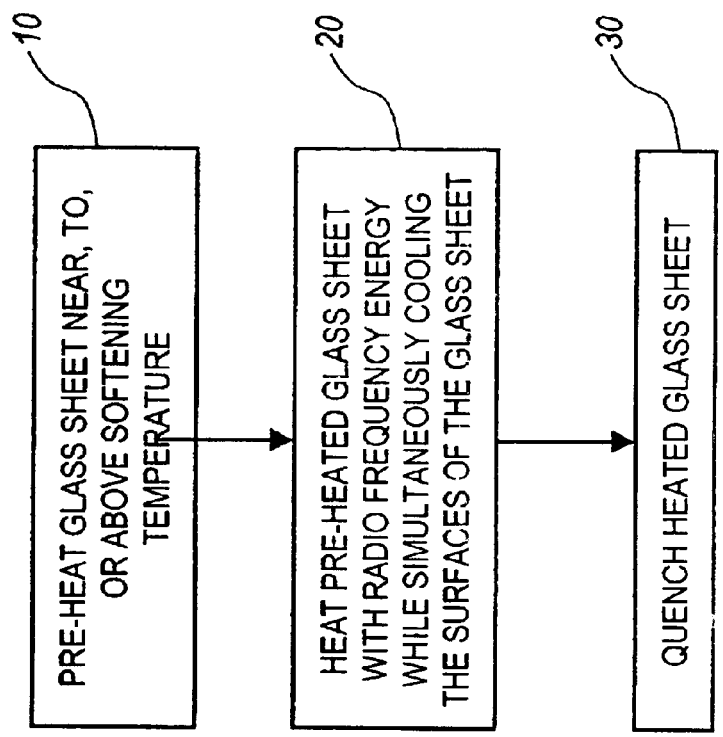
FIG. 1 is a flowchart of a method, according to the present invention, of forming a tempered-glass sheet.

Referring to FIG. 1, one embodiment of a method, according to the present invention, is shown for heating, forming, and tempering a glass sheet. Although the method is shown in the figures and described below is used in connection with a glass sheet, it should be appreciated that the method can be used in connection with any suitable glass object.

The method includes a first step 10 of pre-heating the glass sheet to a temperature substantially at or above its softening temperature, which is typically in the range of about 900° F. to about 950° F. This pre-heating can be accomplished in any number of conventional ways, including heating with infrared energy.

The method also includes a second step 20 of heating the pre-heated glass sheet with radio-frequency energy while simultaneously cooling at least one outer surface of the glass sheet to treat the glass sheet. For example, one or more air streams directed at the glass sheet can be used to cool the at least one outer surface. Preferably, the two major outer surfaces of the glass sheet are cooled. Also preferably, the radio-frequency energy heats the pre-heated glass sheet to its forming temperature, which is in the range of about 1150° F. to about 1250° F. Additionally, the radio-frequency energy is maintained at a frequency of about 0.1 GHz to about less than 2.0 GHz, preferably at a frequency of 0.4 GHz.

The purpose of the cooling of the surfaces of the glass sheet is to maintain a desired temperature differential or gradient between the center of the glass sheet and the surfaces of the glass sheet, with the center of the glass sheet having a higher temperature than the temperature of the surfaces of the glass sheet.

The method includes a third step 30 of quenching the treated (heated) glass sheet in any number of conventional ways to produce a tempered-glass sheet. One such way is to apply one or more air streams to the treated-glass sheet, preferably directed at both major outer surfaces thereof. Also preferably, the temperature of the treated-glass sheet is reduced to a temperature within the range of about 400° F. to about 600° F. or less during the quenching process. After the quenching process, the tempered-glass sheet can be further cooled, for example, to room temperature.

Figure 2:
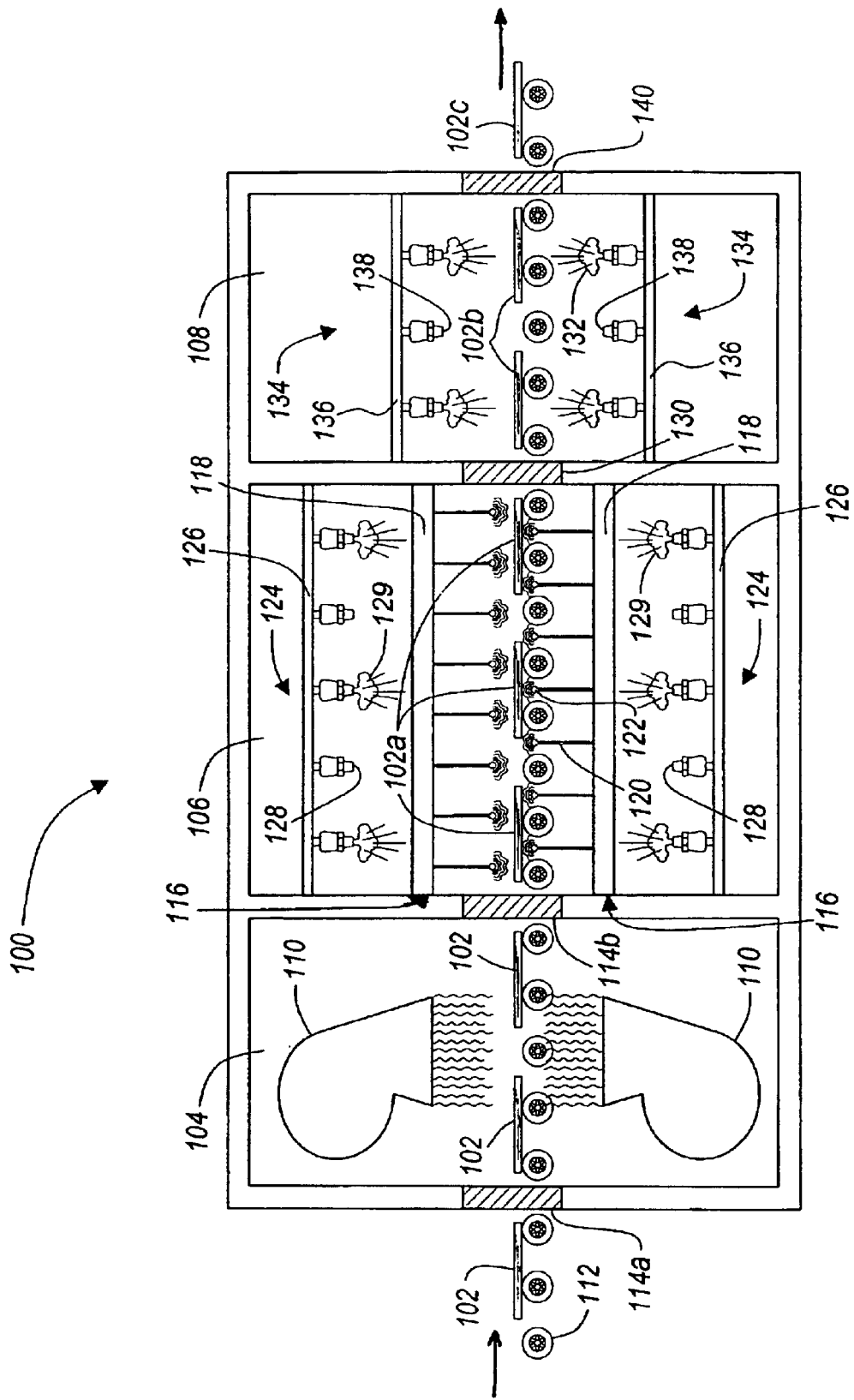
FIG. 2 is a fragmentary elevational view of a system, according to the present invention, of forming a tempered-glass sheet.

Referring to FIG. 2, one embodiment of a system 100, according to the present invention, for use in conjunction with the method of the present invention for heating, forming, and tempering a glass sheet 102, is shown. The system 100 primarily includes three sections: a pre-heating section 104; a heating/cooling section 106; and a quenching section 108. Although the sections 104, 106, and 108 are shown as being in abutting relationship, it should be appreciated that the sections 104, 106, and 108 can also be separated by passageways, tunnels, conduits, tubes, and/or other suitable structures.

The purpose of the pre-heating section 104 (e.g., a lehr, furnace, oven, or other suitable device) is to raise the temperature of the glass sheet 102 to a temperature substantially at or above the softening temperature of the glass sheet 102, which is typically in the range of about 900° F. to about 950° F. Preferably, at least one heat source 110 (e.g., an infrared-heat lamp) is positioned over and/or below the glass sheet 102 as the glass sheet 102 is introduced into the pre-heating section 104 on a series of selectively operable rollers 112 that rotate in a desired direction to move the glass sheet 102 in a particular direction. The heat source 110 preferably evenly heats the glass sheet 102 as the glass sheet 102 progresses through the pre-heating section 104. It should be appreciated that the pre-heated glass sheet 102a can be formed into any number of shapes and configurations, such as, but not limited to, a windshield for a motor vehicle (not shown).

The pre-heating section 104 can also be provided with a first optional door system 114a that is selectively operable to open when a glass sheet 102 is about to be admitted into the pre-heating section 104 and closed once the glass sheet 102 has been admitted into the pre-heating section 104 to preserve the temperature level within the pre-heating section 104. Furthermore, the pre-heating section 104 can be provided also with a second optional door system 114b that is selectively operable to open when the pre-heated glass sheet 102a is about to be admitted into the heating/cooling section 106 and closed once the pre-heated glass sheet 102a has been admitted into the heating/cooling section 106 to preserve the temperature level within the pre-heating section 104.

The purpose of the heating/cooling section 106 (e.g., a lehr, furnace, oven, or other suitable device) is to raise the temperature of the pre-heated glass sheet 102a to its forming temperature, which is in the range of about 1150° F. to about 1250° F., while simultaneously cooling at least one surface of the pre-heated glass sheet 102a. The heating is accomplished by application of radio-frequency energy at the pre-heated glass sheet 102a.

Preferably, at least one radio-frequency energy source, generally indicated at 116, is positioned over and/or below the pre-heated glass sheet 102a as the pre-heated glass sheet 102a is introduced into the heating/cooling section 106 on a series of selectively operable rollers 112 that rotate in a desired direction to move the pre-heated glass sheet 102a in a particular direction. The radio-frequency energy source 116 includes a bus bar 118 having a plurality of electrodes 120 extending therefrom toward the pre-heated glass sheet 102a. A terminal portion 122 of each of the electrodes 120 is positioned as closely as possible to and in non-contacting relationship with a major outer surface of the pre-heated glass sheet 102a.

The radio-frequency energy source 116 evenly heats the pre-heated glass sheet 102a as the pre-heated glass sheet 102a progresses through the heating/cooling section 106 to form a heated glass sheet 102b. The radio-frequency energy is maintained at a frequency of about 0.1 gigahertz (GHz) to about 2.0 gigahertz (GHz), preferably at a frequency of 0.4 gigahertz (GHz).

While the pre-heated glass sheet 102a is being heated by the radio-frequency energy source 116 to form the treated glass sheet 102b, at least one outer surface-preferably, the two major outer surfaces-of the pre-heated glass sheet 102a/treated glass sheet 102b are simultaneously being cooled to maintain a desired temperature differential or gradient between the center of the pre-heated glass sheet 102a/treated glass sheet 102b and the two major outer surfaces of the pre-heated glass sheet 102a/treated glass sheet 102b. The center of the pre-heated glass sheet 102a/treated glass sheet 102b has a higher temperature than that of the outer surfaces of the pre-heated glass sheet 102a/treated glass sheet 102b. The cooling is accomplished by application of at least one air stream 129 at the pre-heated glass sheet 102a/treated glass sheet 102b. It should be appreciated that the combination of the heating and cooling form the treated-glass sheet 102b.

The cooling is preferably accomplished by application of at least one air stream or compressed air 129 at the pre-heated glass sheet 102a/treated glass sheet 102b. More specifically, at least one cooling system, generally indicated at 124, is positioned over and/or below the pre-heated glass sheet 102a/treated glass sheet 102b as the pre-heated glass sheet 102a/treated glass sheet 102b progresses through the heating/cooling section 106. The cooling system 124 includes a source 126 of the compressed air 129 that is dispensed through at least one nozzle 128 and, preferably, a plurality of nozzles 128. The nozzles 128 can be configured in one or more arrays of fixed, reciprocating, or rotating nozzles 128.

Figure 5:
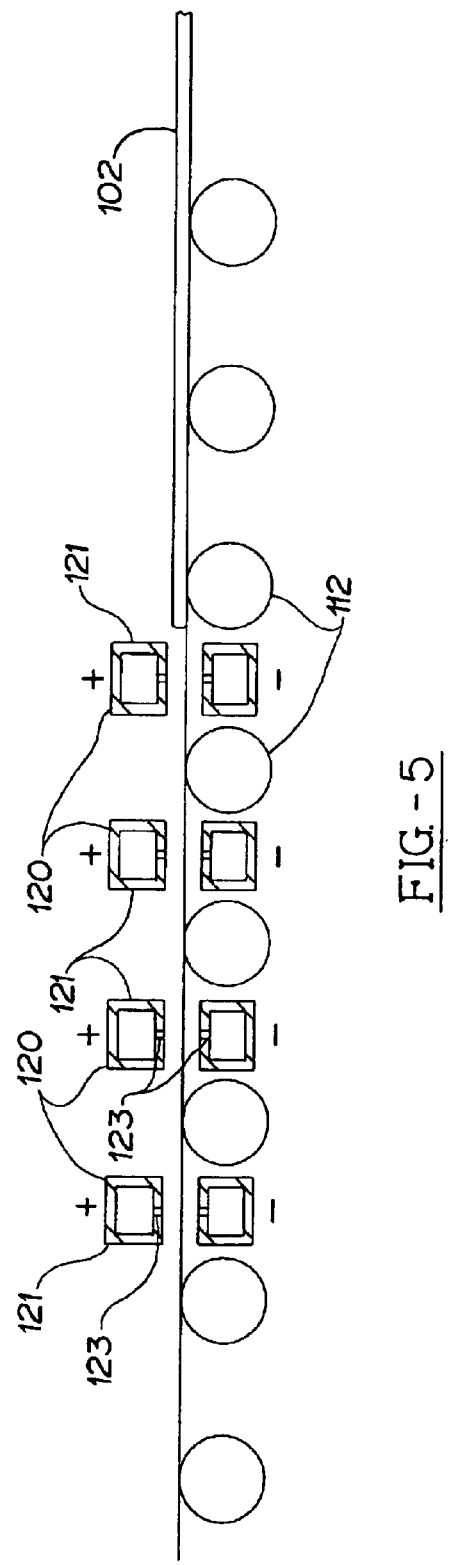
FIG. 5 is a fragmentary elevational view of another embodiment, according to the present invention, of the system for forming a tempered-glass sheet of FIG. 2.

In another embodiment illustrated in FIG. 5, the electrodes 120 can be made of tubular members or sections 121 having at least one aperture 123 for compressed air to be passed through these tubular sections 121 to bring about the simultaneous cooling effect. The tubular sections 121 are located between the rollers 112 and above and below the glass sheet 102 to pass therethrough.

It should be appreciated that the system 100 can be used to temper relatively thin glass sheets 102 (e.g., less than 0.125 inches in thickness). It should also be appreciated that the system 100 can be used to temper relatively normal thickness glass sheets (e.g., 0.375 inches in thickness and greater) using less compressed air for quenching. It should further be appreciated that one or more temperature-measuring devices (not shown) can be used to measure the temperature of the pre-heated glass sheet 102a/treated-glass sheet 102b. It should further be appreciated that the treated-glass sheet 102b can be formed into any number of shapes and configurations, such as, but not limited to, a windshield for a motor vehicle (not shown).

The heating/cooling section 106 also can be provided with an optional door system 130 that is selectively operable to open when the treated-glass sheet 102b is about to be expelled from the heating/cooling section 106 and closed once the treated-glass sheet 102b has been admitted into the quenching section 108 to preserve the temperature level within the heating/cooling section 106.

The purpose of the quenching section 108 is to suddenly and rapidly quench the treated-glass sheet 102b to form a tempered-glass sheet 102c. Preferably, the temperature of the treated-glass sheet 102b is reduced to a temperature within the range of about 400° F. to about 600° F. or less during the quenching process to form the tempered-glass sheet 102c. After the quenching process, the tempered-glass sheet 102c can be further cooled, for example, to room temperature.

The quenching is preferably accomplished by application of at least one air stream 132 at the treated-glass sheet 102b. More specifically, at least one cooling system, generally indicated 134, is positioned over and/or below the treated-glass sheet 102b/tempered glass sheet 102c as the treated-glass sheet 102b/tempered glass sheet 102c progresses through the quenching section 108. Preferably, the cooling system 134 evenly cools the treated-glass sheet 102b as the treated-glass sheet 102b progresses through the quenching section 108 to form the tempered-glass sheet 102c.

The cooling system 134 preferably includes at least one source 136 of compressed air 132 that is dispensed through at least one nozzle 138 and, preferably, a plurality of nozzles 138. The nozzles 138 can be configured in one or more arrays of fixed, reciprocating, or rotating nozzles.

The quenching section 108 also can be provided with an optional door system 140 that is selectively operable to open when the tempered-glass sheet 102c is about to be expelled from the quenching section 108 and closed once the tempered-glass sheet 102c has been expelled into the ambient atmosphere to preserve the temperature level within the quenching section 108.

Figure 4:
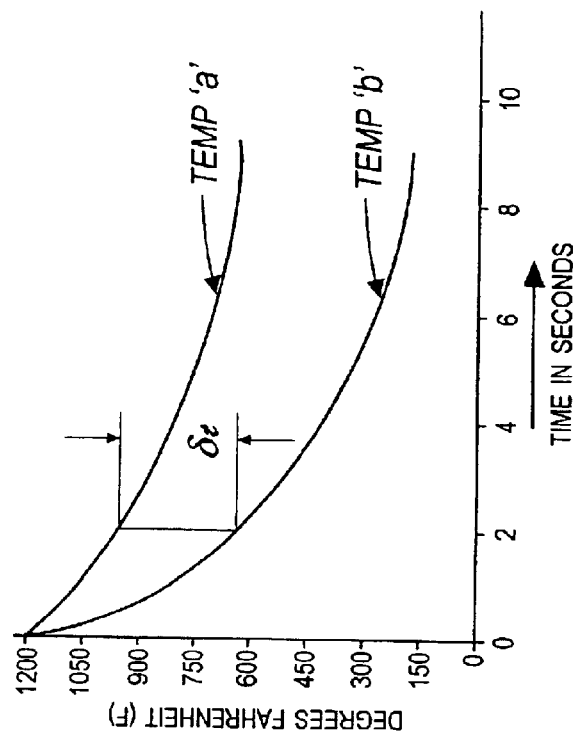
FIG. 4 is a graph of temperature differential between a center and an outer surface of a relatively thin glass sheet simultaneously heated and cooled in accordance with the system and method of the present invention.
Figure 3:
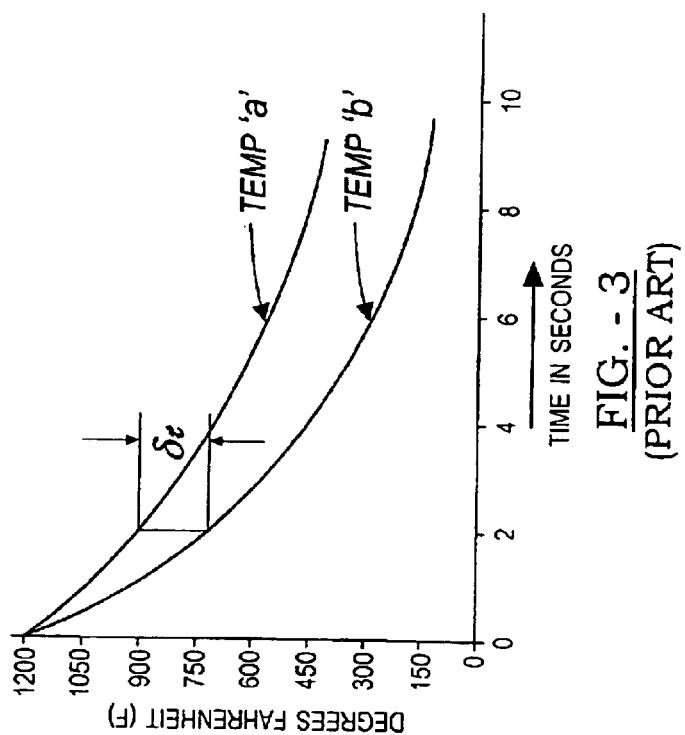
FIG. 3 is a graph of temperature differential between a center and an outer surface of a relatively thin glass sheet heated in accordance with conventional tempering techniques of the prior art.

Referring to FIGS. 3 and 4, there are shown graphical comparisons of the temperature differential ($\delta t$) between the center "a" of a relatively thin glass sheet 102 and an outer surface "b" of the glass sheet 102 with reference to a conventional tempering system and method and the tempering system and method of the present invention, respectively. FIG. 3 shows that a normal quench of the relatively thin glass sheet 102 heated in a conventional manner produces a relatively small temperature differential ($\delta t$) between the center "a" of the glass sheet 102 and an outer surface "b" of the glass sheet 102. That is, there is not a very great temperature differential between the center and the outer surface of the glass sheet 102. This is highly undesirable for tempering relatively thin glass sheets 102 because the lack of a significant temperature differential ($\delta t$) will not permit the formation of induced stresses in the glass sheets 102 when the treated-glass sheets 102b are quenched.

Conversely, FIG. 4 shows that a normal quench of a relatively thin glass sheet 102 heated in accordance with the present invention produces a greater temperature differential ($\delta t$) between the center "a" of the glass sheet 102 and an outer surface "b" of the glass sheet 102 compared to such temperature differentials ($\delta t$) resulting from conventional tempering techniques. That is, there is a greater temperature differential between the center and the outer surface of the glass sheet 102 compared to such temperature differentials resulting from conventional tempering techniques. This is highly desirable for tempering relatively thin glass sheets 102 because the presence of a significant temperature differential (δt) will permit the formation of induced stresses in the glass sheets 102 when the treated-glass sheets 102*b* are quenched.

Accordingly, the present invention employs radio-frequency energy to rapidly, efficiently, and inexpensively heat pre-heated glass during the heating or treating portion of the tempering process. Simultaneously, one or more air streams are preferably employed during the treating portion of the tempering process to maintain a desired temperature differential or gradient between the center of the glass and at least one outer surface of the glass. The treated glass is then quenched to produce tempered glass.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for heating, forming, and tempering a glass sheet comprising the steps of:
   providing at least one electrode having at least one aperture;
   pre-heating the glass sheet to at least a first predetermined temperature;
   applying radio-frequency energy from the at least one electrode to the glass sheet to heat the glass sheet to at least a second predetermined temperature; and
   applying at least one air stream through the at least one aperture of the at least one electrode to cool at least one outer surface of the glass sheet to at least a third predetermined temperature to temper the glass sheet.

2. A method as set forth in claim 1 wherein said radio-frequency energy is a frequency within a range of about 0.1 GHz to about 2.0 GHz.

3. A method as set forth in claim 1 wherein said radio-frequency energy is a frequency of about 0.4 GHz.

4. A method as set forth in claim 1 including the step of cooling the glass sheet by directing the at least one air stream at the at least one outer surface of the glass sheet.

5. A method as set forth in claim 1 including the step of quenching the glass sheet to produce a tempered-glass sheet.

6. A method as set forth in claim 5 wherein said step of quenching comprises applying at least one air stream to the at least one outer surface of the treated-glass sheet.

7. A method as set forth in claim 5 wherein said step of quenching reduces a temperature of the treated-glass sheet to a temperature within the range of about 400° F. to about 600° F.

8. A method as set forth in claim 1 wherein the first predetermined temperature is a temperature in the range of about 900° F. to about 950° F.

9. A method as set forth in claim 1 wherein the second predetermined temperature is a temperature within a range of about 1150° F. to about 1250° F.

10. A method as set forth in claim 1 wherein said step of pre-heating of the glass sheet to at least the first predetermined temperature comprises heating with either infrared energy or convective energy.

11. A method for heating, forming, and tempering a glass sheet comprising the steps of:
    providing at least one hollow electrode;
    pre-heating the glass sheet to at least a first predetermined temperature;
    applying radio-frequency energy from the at least one hollow electrode to the glass sheet to heat the glass sheet to at least a second predetermined temperature; and
    applying at least one air stream through the at least one hollow electrode to at least one outer surface of the glass sheet to cool the at least one outer surface of the glass sheet to at least a third predetermined temperature to temper the glass sheet.

12. A method for heating, forming, and tempering a glass sheet comprising the steps of:
    providing at least one hollow electrode;
    pre-heating the glass sheet to at least a first predetermined temperature;
    applying radio-frequency energy with a frequency within a range of about 0.1 GHz to about 2.0 GHz from the at least one hollow electrode to the glass sheet to heat the glass sheet to at least a second predetermined temperature; and
    applying at least one air stream through the at least one hollow electrode to at least one outer surface of the glass sheet to cool the at least one outer surface of the glass sheet to at least a third predetermined temperature to temper the glass sheet.

\* \* \* \* \*